(12) United States Patent
Knight

(10) Patent No.: US 10,743,518 B2
(45) Date of Patent: Aug. 18, 2020

(54) WILD GAME FEEDER

(71) Applicant: Douglas Feeders and Accessories, LLC, Booneville, MS (US)

(72) Inventor: Douglas H Knight, Booneville, MS (US)

(73) Assignee: Douglas Feeders and Accessories, LLC, Booneville, MS (US)

( * ) Notice: Subject to any disclaimer, the term of this patent is extended or adjusted under 35 U.S.C. 154(b) by 726 days.

(21) Appl. No.: 14/796,015

(22) Filed: Jul. 10, 2015

(65) Prior Publication Data
US 2017/0006825 A1    Jan. 12, 2017

(51) Int. Cl.
*A01K 5/02* (2006.01)

(52) U.S. Cl.
CPC .......... *A01K 5/0258* (2013.01); *A01K 5/0225* (2013.01); *A01K 5/0291* (2013.01)

(58) Field of Classification Search
CPC ...... A01K 5/0225; A01K 5/0291; A01K 5/02; A01K 5/0258; A01K 61/80
USPC .... 119/51.11, 57.7, 57.92, 51.02, 56.1, 56.2, 119/57.1, 57.2, 57.91
See application file for complete search history.

(56) References Cited

U.S. PATENT DOCUMENTS

| | | | |
|---|---|---|---|
| 3,962,997 A * | 6/1976 | Ruth | A01K 5/0283 119/51.11 |
| 4,502,416 A | 3/1985 | Keysell et al. | |
| 5,275,129 A * | 1/1994 | Vigesaa | A01K 5/0291 119/51.11 |
| 5,299,529 A * | 4/1994 | Ramirez | A01K 5/0291 119/51.11 |
| 5,363,805 A * | 11/1994 | Wing | A01K 5/0291 119/51.11 |
| 5,370,080 A | 12/1994 | Koepp | |
| 5,555,842 A | 9/1996 | Chocola et al. | |
| 6,715,443 B2 | 4/2004 | Reece | |
| 6,779,486 B2 * | 8/2004 | Vaags | A01K 61/02 119/51.02 |
| 7,798,098 B1 | 9/2010 | Patterson | |
| 8,096,265 B1 * | 1/2012 | Wisecarver | A01K 5/0225 119/56.1 |
| 8,800,489 B2 * | 8/2014 | Coxsey | A01K 5/0225 119/51.11 |
| 2003/0019437 A1 * | 1/2003 | Fore | A01K 5/02 119/57.92 |
| 2015/0068762 A1 | 3/2015 | Brooks et al. | |
| 2015/0090186 A1 | 4/2015 | Massicotte | |

* cited by examiner

*Primary Examiner* — Yvonne R Abbott-Lewis
(74) *Attorney, Agent, or Firm* — Clark & Brody LP

(57) ABSTRACT

A wild game feeder for safely feeding game that uses an inverted cone-shaped device to disperse the feed once the feed is expelled through the dispenser hole, that can be suspended from any structure.

3 Claims, 3 Drawing Sheets

WILD GAME FEEDER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

The present disclosure reveals an apparatus for the automatic feeding of wild game with the use of a feed storage container and a dispensing system. The dispensing system comprises an auger contained within a housing that is attached to the bottom of the feed storage container. A hole in the bottom of the feed storage container allows feed to flow from the feed storage container into the housing. The auger is operated by a slow rotation speed motor that is on a timer. The timer establishes regular intervals at which the motor is activated, causing the auger to rotate, which transports the food to a dispenser hole in the housing where the food is distributed for feeding purposes.

Background of the Invention

Hunters use feed to attract wild game. However, it has been found that the preferred method of feeding is the spreading of the feed on the ground, rather than in a trough. Spreading involves regular trips to the location to spread the feed. Automated feeders can also be used but have difficulties. First, many supply the feed to a trough or holding container the wild game may not be inclined to eat from. Also, spread feeders can fling the feed like projectiles, which chases the wild game away or may even injure the game. The present disclosure reveals a timed, drop feeder method that spreads the feed and does not risk injury to the wild game.

SUMMARY OF THE INVENTION

The present disclosure reveals an apparatus for the automatic feeding of wild game with the use of a feed storage container and a dispensing system, the wild game feeder. The dispensing system comprises an auger contained within a housing that is attached to the bottom of the feed storage container. A hole in the bottom of the feed storage container allows feed to flow from the feed storage container into the housing. The auger is operated by a battery operated slow rotation speed motor, where the rotation speed is less than 50 rotations per minute. The motor is controlled by a timer. The timer establishes regular intervals at which the motor is activated, be that hourly, daily, twice a week, or otherwise. Once activated, the motor causes the auger to rotate, which transports the food to a dispenser hole in the housing where the food is distributed for feeding purposes.

In one embodiment, the feed storage container comprises a funnel-like means to direct the feed within the storage container to the hole in the bottom of the storage container, so that some feed does not get trapped in the storage container and thus prevent the trapped feed from rotting or spoiling.

In a second embodiment, below the dispenser hole in the housing is an inverted cone-shaped device such that, when the feed drops through the dispenser hole, it contacts the inverted cone-shaped device, and the inverted cone-shaped device spreads the feed so that the feed does not lie in a pile beneath the wild game feeder.

In a third embodiment, the battery is connected to a solar cell capable of recharging the battery to ensure the motor has sufficient power to operate.

DETAILED DESCRIPTION OF THE INVENTION

Figure 1:
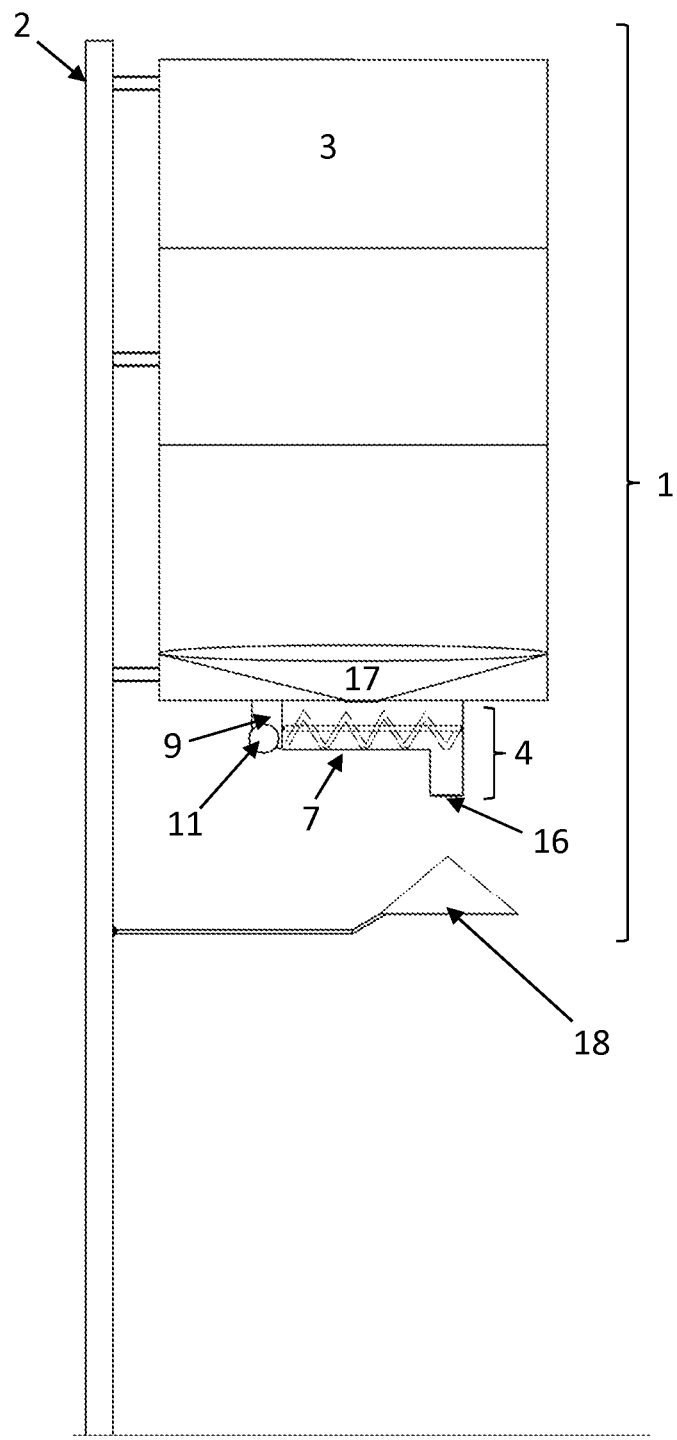
FIG. 1 is a display of the wild game feeder.
Figure 2:
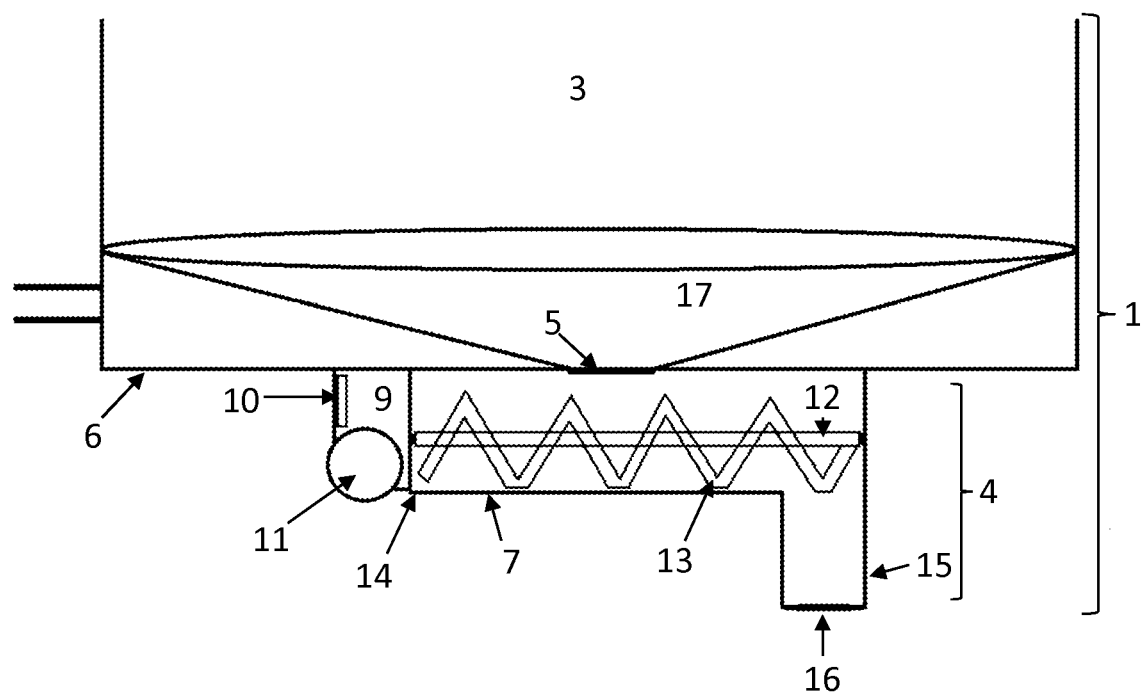
FIG. 2 is a display of the dispensing system of the wild game feeder.
Figure 3:
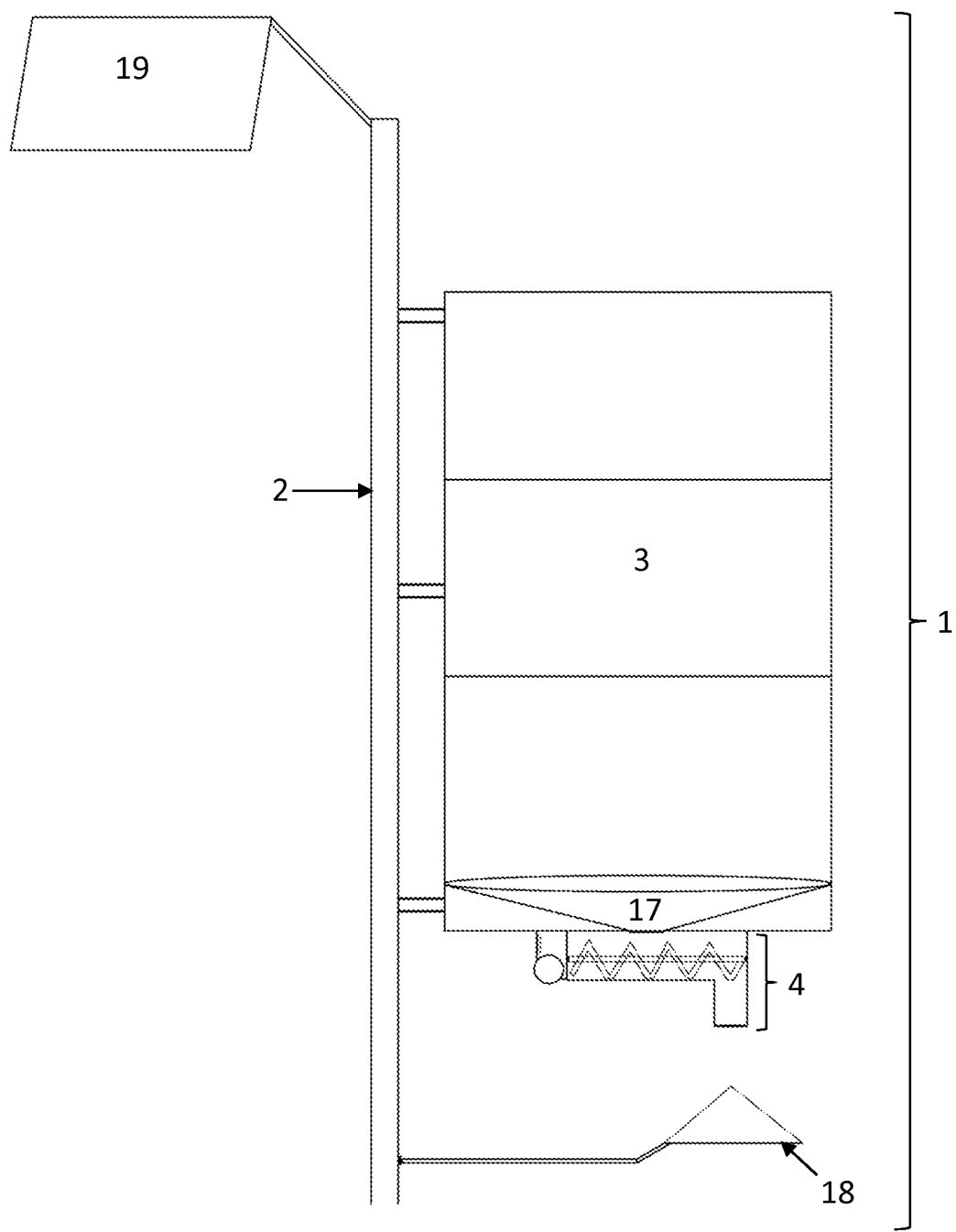
FIG. 3 is a display of a wild game feeder with solar panel.

The present disclosure is of a wild game feeder 1 for safely feeding game in the wild comprising a structure means 2, a feed storage container 3 and a dispensing system 4. The structure means 2 is any object to which the wild game feeder 1 can be attached so that it is elevated from the ground including but not limited to a tree, pole, building, or other structure.

The feed storage container 3 is capable of holding feed for the wild game and comprises a hole 5 in the bottom 6 of the feed storage container 3. The dispensing system comprises a housing 7, auger 8, a slow rotation speed motor 9 wherein the slow rotation speed motor is operated by a battery 10, and a timer 11. The auger 8 comprises an axis 12 and a series of flights 13 that spirals around the axis 12. The housing 7 comprises a feeder end 14, a dispenser end 15, and a dispenser hole 16 near the dispenser end 15.

The auger 8 is within the housing 7 and the axis 12 of the auger 8 extends from the feeder end 14 to the dispenser end 15 and is attached to the housing 7 in such a fashion to allow to auger 8 to rotate around its axis 12. The slow rotation speed motor 9 and battery 10 are attached to the housing 7 and the slow rotation speed motor 9 is powered by the battery 10. The slow rotation speed motor 9 is also attached to the axis 12 of the auger 8 and the slow rotation speed motor 9 rotates the auger 8 when the slow rotation speed motor 9 is activated. The timer 11 is programmable, is attached to the slow rotation motor 9 and controls when the slow rotation motor 9 is activated. The housing 7 is attached to the bottom 6 of the feed storage container 3 and positioned in such a fashion so that when feed passes through the hole 5 in the bottom 6 of the feed storage container 3 the feed collects around the auger 8 at the end of the housing 7 near the feeder end 15.

The housing 7 is shaped so that feed that falls through the hole 5 in the bottom 6 of the feed storage container 3 is trapped around the flights 13 of the auger 8 and the feed cannot go around the flights 13 of the auger to the dispenser hole 16. When the slow rotation speed motor 9 is activated, the auger 8 rotates, moving feed from where it fell from the feed storage container 3 to the dispenser hole 16, where the feed is then dispensed.

The feed storage container may further comprise a funnel-like means 17 to direct the feed within the feed storage container 3 to the hole 5 in the bottom 6 of the feed storage container 3, so that some feed does not get trapped in the feed storage container 3 and thus the funnel-like means 17 prevents the otherwise trapped feed from rotting or spoiling.

Below the dispenser hole 16 may be an inverted cone-shaped device 18 such that, when the feed drops through the dispenser hole 16, the feed contacts the inverted cone-shaped device 18, and the inverted cone-shaped device 18 spreads the feed so that the feed does not lie in a pile beneath the wild game feeder 1.

The battery 10 may also be connected to a solar cell 19 capable of recharging the battery to ensure the slow rotation speed motor 9 has sufficient and consistent power to operate.

What is claimed:

1. A wild game feeder for safely feeding game in the wild comprising:
    A structure means, a feed storage container and a dispensing system;
    the feed storage container is capable of holding feed for the wild game and comprises a bottom and a hole in the bottom of the feed storage container;
    the dispensing system comprises a housing, auger, a slow rotation speed motor wherein the slow rotation speed motor is operated by a battery, and a timer;
    the auger comprises an axis and a series of flights that spiral around the axis;
    the housing comprises a feeder end and a dispenser end;
    the auger is within the housing and the axis of the auger extends from the feeder end to the dispenser end and is attached to the housing in such a fashion to allow to auger to rotate around the axis;
    the slow rotation speed motor and battery are attached to the housing, attached to the axis of the auger and the slow rotation speed motor rotates the auger when the slow rotation speed motor is activated;
    the timer is attached to the slow rotation speed motor, is programmable, is attached to the slow rotation motor, and controls when the slow rotation motor is activated;
    the housing is attached to the bottom of the feed storage container and positioned in such a fashion so that when feed falls through the hole in the bottom of the feed storage container the feed collects around the auger at the feeder end;
    the housing also comprises a dispenser hole near the dispenser end;
    the housing is shaped so that feed that falls through the hole in the bottom of the feed storage container is trapped around the flights of the auger and the feed cannot go around the flights of the auger to the dispenser hole;
    when the motor is activated, the auger turns, moving feed from where it fell from the feed storage container to the dispenser hole, where the feed is then dispensed; and
    wherein below the dispenser hole is an inverted cone-shaped device such that, when the feed drops through the dispenser hole, it contacts the inverted cone-shaped device, and the inverted cone-shaped device spreads the feed so that the feed does not lie in a pile beneath the wild game feeder.

2. A wild game feeder for safely feeding game in the wild comprising:
    A structure means, a feed storage container and a dispensing system;
    the feed storage container is capable of holding feed for the wild game and comprises a bottom and a hole in the bottom of the feed storage container;
    the dispensing system comprises a housing, auger, a slow rotation speed motor wherein the slow rotation speed motor is operated by a battery, and a timer;
    the auger comprises an axis and a series of flights that spiral around the axis;
    the housing comprises a feeder end and a dispenser end;
    the auger is within the housing and the axis of the auger extends from the feeder end to the dispenser end and is attached to the housing in such a fashion to allow to auger to rotate around the axis;
    the slow rotation speed motor and battery are attached to the housing, attached to the axis of the auger and the slow rotation speed motor rotates the auger when the slow rotation speed motor is activated;
    the timer is attached to the slow rotation speed motor, is programmable, is attached to the slow rotation motor, and controls when the slow rotation motor is activated;
    the housing is attached to the bottom of the feed storage container and positioned in such a fashion so that when feed falls through the hole in the bottom of the feed storage container the feed collects around the auger at the feeder end;
    the housing also comprises a dispenser hole near the dispenser end;
    the housing is shaped so that feed that falls through the hole in the bottom of the feed storage container is trapped around the flights of the auger and the feed cannot go around the flights of the auger to the dispenser hole;
    when the motor is activated, the auger turns, moving feed from where it fell from the feed storage container to the dispenser hole, where the feed is then dispensed;
    wherein the feed storage container further comprises a funnel-like means to direct the feed within the feed storage container to the hole in the bottom of the feed storage container, so that some feed does not get trapped in the storage container and thus the funnel-like means prevents the otherwise trapped feed from rotting or spoiling; and
    wherein below the dispenser hole is an inverted cone-shaped device such that, when the feed drops through the dispenser hole, it contacts the inverted cone-shaped device, and the inverted cone-shaped device spreads the feed so that the feed does not lie in a pile beneath the wild game feeder.

3. The wild game feeder of claim 1 or 2 wherein the battery is connected to a solar cell capable of recharging the battery to ensure the motor has sufficient and continuous power to operate.

* * * * *